(12) United States Patent
Chae

(10) Patent No.: US 11,615,794 B2
(45) Date of Patent: *Mar. 28, 2023

(54) VOICE RECOGNITION SYSTEM, SERVER, DISPLAY APPARATUS AND CONTROL METHODS THEREOF

(71) Applicant: SAMSUNG ELECTRONICS CO., LTD., Suwon-si (KR)

(72) Inventor: Ji-Eun Chae, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

This patent is subject to a terminal disclaimer.

(21) Appl. No.: 16/742,350

(22) Filed: Jan. 14, 2020

(65) Prior Publication Data

US 2020/0152199 A1 May 14, 2020

Related U.S. Application Data

(63) Continuation of application No. 14/931,153, filed on Nov. 3, 2015, now Pat. No. 10,593,327.

(30) Foreign Application Priority Data

Nov. 17, 2014 (KR) .................. 10-2014-0160130

(51) Int. Cl.
*G10L 15/18* (2013.01)
*G10L 15/22* (2006.01)
(Continued)

(52) U.S. Cl.
CPC .............. *G10L 15/22* (2013.01); *G06F 3/167* (2013.01); *G06F 9/453* (2018.02); *G10L 15/00* (2013.01);
(Continued)

(58) Field of Classification Search
CPC ................................ G06F 11/321; G06F 3/14
See application file for complete search history.

(56) References Cited

U.S. PATENT DOCUMENTS

| 6,678,591 B2 | 1/2004 | Ohmura et al. | |
|---|---|---|---|
| 6,850,252 B1 * | 2/2005 | Hoffberg | H04N 21/475 380/252 |

(Continued)

FOREIGN PATENT DOCUMENTS

| CN | 103325020 | 9/2013 |
|---|---|---|
| EP | 2 750 027 A2 | 7/2014 |

(Continued)

OTHER PUBLICATIONS

Chinese Office Action dated Jul. 9, 2020 from Chinese Application No. 201510790693.3, 26 pages.

(Continued)

*Primary Examiner* — Seong-Ah A Shin
(74) *Attorney, Agent, or Firm* — Staas & Halsey LLP

(57) ABSTRACT

A voice recognition system includes a server storing a plurality of manuals and a display apparatus transmitting, when a spoken voice of a user is recognized, characteristic information and a spoken voice signal corresponding to the spoken voice to the server, the characteristic information is characteristic information of the display apparatus, the server transmits a response signal to the spoken voice signal to the display apparatus based on a manual corresponding to the characteristic information among the plurality of manuals, and the display apparatus processes an operation corresponding to the received response signal; as a result, user convenience increases.

8 Claims, 18 Drawing Sheets

(51) Int. Cl.
*G06F 9/451* (2018.01)
*G06F 3/16* (2006.01)
*G10L 15/00* (2013.01)
*G10L 15/30* (2013.01)

(52) U.S. Cl.
CPC ........ *G10L 15/30* (2013.01); *G10L 2015/223* (2013.01)

(56) References Cited

U.S. PATENT DOCUMENTS

| | | | |
|---|---|---|---|
| 7,496,500 B2 | 2/2009 | Reed et al. | |
| 7,941,492 B2 | 5/2011 | Pearson et al. | |
| 8,161,125 B2 | 4/2012 | Pearson et al. | |
| 8,230,032 B2 | 7/2012 | Pearson et al. | |
| 9,219,949 B2 | 12/2015 | Heo et al. | |
| 2002/0052737 A1* | 5/2002 | Kim | G10L 19/02 704/E19.01 |
| 2002/0103582 A1* | 8/2002 | Ohmura | G07C 5/008 701/31.4 |
| 2002/0166084 A1* | 11/2002 | Raynham | G06F 11/0709 714/37 |
| 2003/0165218 A1* | 9/2003 | Kadota | G06F 9/453 379/67.1 |
| 2004/0015346 A1* | 1/2004 | Yasunaga | G10L 19/07 704/E19.025 |
| 2004/0042622 A1* | 3/2004 | Saito | G10L 19/26 704/E21.009 |
| 2004/0092846 A1 | 5/2004 | Watrous | |
| 2004/0111257 A1* | 6/2004 | Sung | G10L 19/173 704/219 |
| 2005/0192992 A1 | 9/2005 | Reed et al. | |
| 2006/0212286 A1 | 9/2006 | Pearson et al. | |
| 2007/0061135 A1* | 3/2007 | Chu | G10L 19/04 704/E19.025 |
| 2007/0093947 A1* | 4/2007 | Gould | G07C 5/008 701/31.5 |
| 2008/0059166 A1* | 3/2008 | Ehara | G10L 19/24 704/E19.044 |
| 2008/0126084 A1* | 5/2008 | Lee | G10L 19/09 704/219 |
| 2008/0176555 A1* | 7/2008 | Okuyama | H04L 65/4046 455/424 |
| 2008/0195381 A1* | 8/2008 | Soong | G10L 25/48 704/200 |
| 2008/0300055 A1* | 12/2008 | Lutnick | G06V 40/107 463/39 |
| 2009/0012780 A1* | 1/2009 | Murashima | G10L 19/083 704/E11.001 |
| 2009/0141790 A1* | 6/2009 | Kawashima | G10L 19/005 375/240 |
| 2009/0204730 A1* | 8/2009 | Mochizuki | G06F 9/453 710/1 |
| 2009/0299738 A1* | 12/2009 | Sato | G10L 19/07 704/E21.001 |
| 2010/0185788 A1* | 7/2010 | Kim | G06F 9/453 709/219 |
| 2010/0223372 A1* | 9/2010 | Nichols | G06F 11/2294 709/223 |
| 2010/0299696 A1* | 11/2010 | Konishi | H04N 21/485 725/25 |
| 2011/0054845 A1* | 3/2011 | Han | H04L 12/2825 702/185 |
| 2011/0107137 A1* | 5/2011 | Lam | G06F 11/0793 714/E11.023 |
| 2011/0185027 A1 | 7/2011 | Pearson et al. | |
| 2011/0185281 A1 | 7/2011 | Pearson et al. | |
| 2012/0095756 A1* | 4/2012 | Sung | G10L 19/07 704/219 |
| 2013/0041665 A1* | 2/2013 | Jang | H04N 21/482 704/E15.001 |
| 2013/0185072 A1* | 7/2013 | Huang | G10L 25/72 704/246 |
| 2013/0339020 A1* | 12/2013 | Heo | H04N 21/6581 704/254 |
| 2014/0006022 A1 | 1/2014 | Yoon et al. | |
| 2014/0188486 A1 | 7/2014 | You et al. | |
| 2014/0191949 A1 | 7/2014 | Park et al. | |
| 2014/0200896 A1 | 7/2014 | Lee et al. | |
| 2014/0282007 A1* | 9/2014 | Fleizach | G06F 9/453 715/728 |
| 2015/0019227 A1* | 1/2015 | Anandarajah | G10L 15/18 704/257 |
| 2015/0309859 A1* | 10/2015 | Elzein | G06F 11/0787 714/49 |
| 2016/0359325 A1* | 12/2016 | Kawata | G16H 50/50 |
| 2022/0057519 A1* | 2/2022 | Goldstein | G01S 17/04 |

FOREIGN PATENT DOCUMENTS

| | | |
|---|---|---|
| EP | 2 945 157 A2 | 11/2015 |
| KR | 2002-0064175 | 8/2002 |
| KR | 10-2006-004333 | 5/2006 |
| KR | 10-2011-0013582 | 2/2011 |
| KR | 10-2013-0070947 | 6/2013 |
| KR | 10-2013-0140423 | 12/2013 |
| KR | 10-2013-0140423 A | 12/2013 |
| KR | 10-2014-0001105 A | 1/2014 |
| KR | 10-2014-0087717 A | 7/2014 |
| KR | 10-2014-0111538 | 9/2014 |

OTHER PUBLICATIONS

Korean Office Action dated Oct. 8, 2021 in Korean Patent Application No. 10-2021-0115950.
Chinese Office Action dated Oct. 8, 2019 in corresponding Chinese Patent Application No. 201510790693.3.
Extended European Search Report dated Oct. 11, 2018 from European Patent Application No. 18180231.5, 7 pages.
European Office Action dated Nov. 29, 2016 in European Patent Application No. 15194791.8.
Extended European Search Report dated Mar. 24, 2016 in corresponding European Patent Application No. 15194791.8.
U.S. Office Action dated Sep. 12, 2016 from corresponding U.S. Appl. No. 14/931,153.
U.S. Office Action dated Feb. 17, 2017 from corresponding U.S. Appl. No. 14/931,153.
U.S. Advisory Action dated May 9, 2017 from corresponding U.S. Appl. No. 14/931,153.
U.S. Office Action dated Jun. 21, 2017 from corresponding U.S. Appl. No. 14/931,153.
U.S. Office Action dated Dec. 12, 2017 from corresponding U.S. Appl. No. 14/931,153.
U.S. Office Action dated Mar. 29, 2018 from corresponding U.S. Appl. No. 14/931,153.
U.S. Office Action dated Nov. 19, 2018 from corresponding U.S. Appl. No. 14/931,153.
U.S. Advisory Action dated Feb. 1, 2019 from corresponding U.S. Appl. No. 14/931,153.
U.S. Office Action dated Mar. 19, 2019 from corresponding U.S. Appl. No. 14/931,153.
U.S. Office Action dated Jul. 22, 2019 from corresponding U.S. Appl. No. 14/931,153.
U.S. Notice of Allowance dated Oct. 1, 2019 from corresponding U.S. Appl. No. 14/931,153.
Korean Office Action dated Dec. 23, 2020 from Korean Application No. 10-2014-0160130, 9 pages.
Extended European Search Report dated Jul. 16, 2021 from European Application No. 20197252.8, 14 pages.
Notice of Allowance dated Dec. 15, 2022 for Korean Patent Application No. 10-2022-0094268.

* cited by examiner

VOICE RECOGNITION SYSTEM, SERVER, DISPLAY APPARATUS AND CONTROL METHODS THEREOF

CROSS-REFERENCE TO RELATED APPLICATIONS

This application is a continuation of U.S. application Ser. No. 14/931,153, filed on Nov. 3, 2015, which claims priority from Korean Patent Application No. 10-2014-0160130, filed on Nov. 17, 2014, in the Korean Intellectual Property Office, the disclosures of which are incorporated herein by reference in their entirety.

BACKGROUND

1. Field

Apparatuses and methods consistent with the embodiments relate to a voice recognition system, a server, a display apparatus, and control methods thereof, and more particularly, to a voice recognition system, a server, a display apparatus, and control methods thereof which processes a corresponding operation according to a response signal generated by recognizing a spoken voice.

2. Description of the Related Art

Electronic apparatuses that recognize voices spoken by users and perform functions corresponding thereto have been increasingly used. In general, a display apparatus capable of recognizing the voice collects the voice spoken by the user and transmits a spoken voice signal corresponding to the collected spoken voice to a server connected through a network. The server that receives the spoken voice signal analyzes the spoken voice signal to determine an intention of the user, and generates the resulting response signal and transmits the generated response signal to the display apparatus. As a result, the display apparatus can execute the function corresponding to the spoken voice of the user or provide information based on the response signal received from the server.

However, the display apparatus capable of recognizing the voice in the related art has a limitation in analyzing the spoken voice of the user and determining the intention of the user based on a result of the analysis. For example, in the case of a simple function such as "channel-up", the server analyzes the spoken voice signal to correctly determine the intention of the user and generates the resulting response signal to transmit the generated signal to the display apparatus. Accordingly, the display apparatus can display a channel requested by the user based on the response signal.

However, when the spoken voice is unclearly recognized or when user's interaction is required, providing the simple function in the related art is not sufficient. If the user speaks "Tell me a recording method.", there is a problem in that a matter to be checked or an operation of the user for recording cannot be instructed to the user for each step and only the recording method is just displayed.

Further, when a spoken voice such as "The screen is abnormal" is recognized, hardware performance of the display apparatus is not checked and there may be no response to the spoken voice. That is, when an executable response signal is not generated from the spoken voice, there is a problem in that an incorrect operation is performed or there is no response.

In addition, although accuracy of a response to a complicated spoken voice is improved by using the server, there is also a problem in that the response signal is generated without reflecting characteristics of respective display apparatuses.

SUMMARY

Exemplary embodiments overcome the above disadvantages and other disadvantages not described above. Also, the embodiments are not required to overcome the disadvantages described above, and an exemplary embodiment may not overcome any of the problems described above.

The embodiments provide a voice recognition system, a server, a display apparatus, and control methods thereof which generate a response signal to a spoken voice of a user based on a prestored manual and process an operation corresponding thereto.

According to an aspect, a voice recognition system includes: a server storing a plurality of manuals and a display apparatus transmitting, when a spoken voice of a user is recognized, characteristic information and a spoken voice signal corresponding to the spoken voice to the server, the characteristic information is characteristic information of the display apparatus, the server transmits a response signal to the spoken voice signal to the display apparatus based on a manual corresponding to the characteristic information among the plurality of manuals, and the display apparatus processes an operation corresponding to the received response signal.

The display apparatus may display, when the response signal includes a guide message or a diagnosis result, the guide message or the diagnosis result.

The display apparatus may process, when the response signal is a control signal to process an operation required for diagnosing the display apparatus, an operation according to the control signal and transmit a state of the operation to the server, and the server may diagnose the display apparatus based on the operational state and transmit a result of the diagnosis to the display apparatus.

According to another aspect, a server includes: at least one processor communicatable with a plurality of devices; and a storage unit storing a plurality of manuals, and at least one processor receives a spoken voice signal corresponding to a spoken voice recognized by one device among the plurality of devices and characteristic information of the device, generates a response signal to the spoken voice signal based on a manual corresponding to the characteristic information among the plurality of manuals of the storage unit, and transmits the response signal to the device.

At least one processor may transmit, when the spoken voice signal is a signal for a function of the device, the response signal including a guide message for guiding a method for executing the function to the device according to the manual corresponding to the device.

At least one processor may diagnose, when the spoken voice signal is a signal for an operational state of the device, the device and transmit a result of the diagnosis to the device.

At least one processor may transmit, when it is diagnosed that the operational state of the device is an error state which is autonomously solved, a guide message for guiding a solving method for the diagnosis result to the device.

At least one processor may transmit, when it is diagnosed that the operational state of the device is an error state which cannot be autonomously solved, the diagnosis result and the characteristic information of the device to a service center.

The characteristic information of the device may include at least one of panel information, type information of the device, user region information, and use time information.

According to yet another aspect, a display apparatus includes: a voice recognitioin unit recognizing a spoken voice of a user; a communication unit performing communications with a server storing a plurality of manuals; and a processor processing, when the spoken voice is determined as a control signal for controlling an operation of the display apparatus, an operation corresponding to the control signal, the processor transmits, when the spoken voice is determined as a signal for at least one of a function and an operational state of the display apparatus, characteristic information of the display apparatus and a spoken voice signal corresponding to the spoken voice to a server through the communication unit.

The processor may process, when a response signal generated according to a manual corresponding to the characteristic information of the display apparatus and contents of the spoken voice signal is received from the server, an operation corresponding to the response signal.

The display apparatus may further include a display unit and the processor may display, when the response signal includes a guide message or a diagnosis result, the guide message or the diagnosis result.

The processor may process, when the response signal is a control signal to process an operation required for diagnosing the display apparatus, an operation according to the control signal and transmit a state of the operation to the server through the communication unit.

The characteristic information of the display apparatus may include at least one of panel information, type information of the display apparatus, user region information, and use time information.

According to still another aspect, a control method of a display apparatus includes: recognizing a spoken voice of a user; determining the type of the spoken voice; and processing, when the spoken voice is determined as a control signal for controlling an operation of the display apparatus, an operation corresponding to the control signal and transmitting, when the spoken voice is determined as a signal for at least one of a function and an operational state of the display apparatus, characteristic information of the display apparatus and a spoken voice signal corresponding to the spoken voice to a server.

The control method may further include: receiving a response signal generated according to a manual corresponding to the characteristic information of the display apparatus and contents of the spoken voice signal from the server; and processing an operation corresponding to the response signal.

In the processing of the operation corresponding to the response signal, when the response signal includes a guide message or a diagnosis result, the guide message or the diagnosis result may be displayed.

In the processing of the operation corresponding to the response signal, when the response signal is a control signal to process an operation required for diagnosing the display apparatus, an operation depending on the control signal may be processed and a state of the operation may be transmitted to the server.

The characteristic information of the display apparatus may include at least one of panel information, type information of the display apparatus, user region information, and use time information.

According to still yet another aspect, there is provided a computer readable medium storing a computer program to perform operations of: recognizing a spoken voice of a user; determining the type of the spoken voice; and processing, when the spoken voice is determined as a control signal for controlling an operation of the display apparatus, an operation corresponding to the control signal and transmitting, when the spoken voice is determined as a signal for at least one of a function and an operational state of the display apparatus, characteristic information of the display apparatus and a spoken voice signal corresponding to the spoken voice to a server.

According to still yet another aspect there is provided a method including: recognizing a voice input of a user from a device of plural devices, diagnosing an operational state of the device based on the recognized voice input and providing a portion of an operation manual for the device to the user where the portion relates to an error, when the operational state indicates that the device is experiencing the error.

The portion may relate to a solution portion in the manual that addresses solving the error.

The portion may include a user guide for correcting the error.

Additional and/or other aspects and advantages of the embodiments will be set forth in part in the description which follows and, in part, will be obvious from the description, or may be learned by practice of the embodiments.

BRIEF DESCRIPTION OF THE DRAWING FIGURES

The above and/or other aspects of the embodiments invention will be more apparent by describing certain exemplary embodiments with reference to the accompanying drawings, in which.

DETAILED DESCRIPTION OF THE EXEMPLARY EMBODIMENTS

Figure 1:
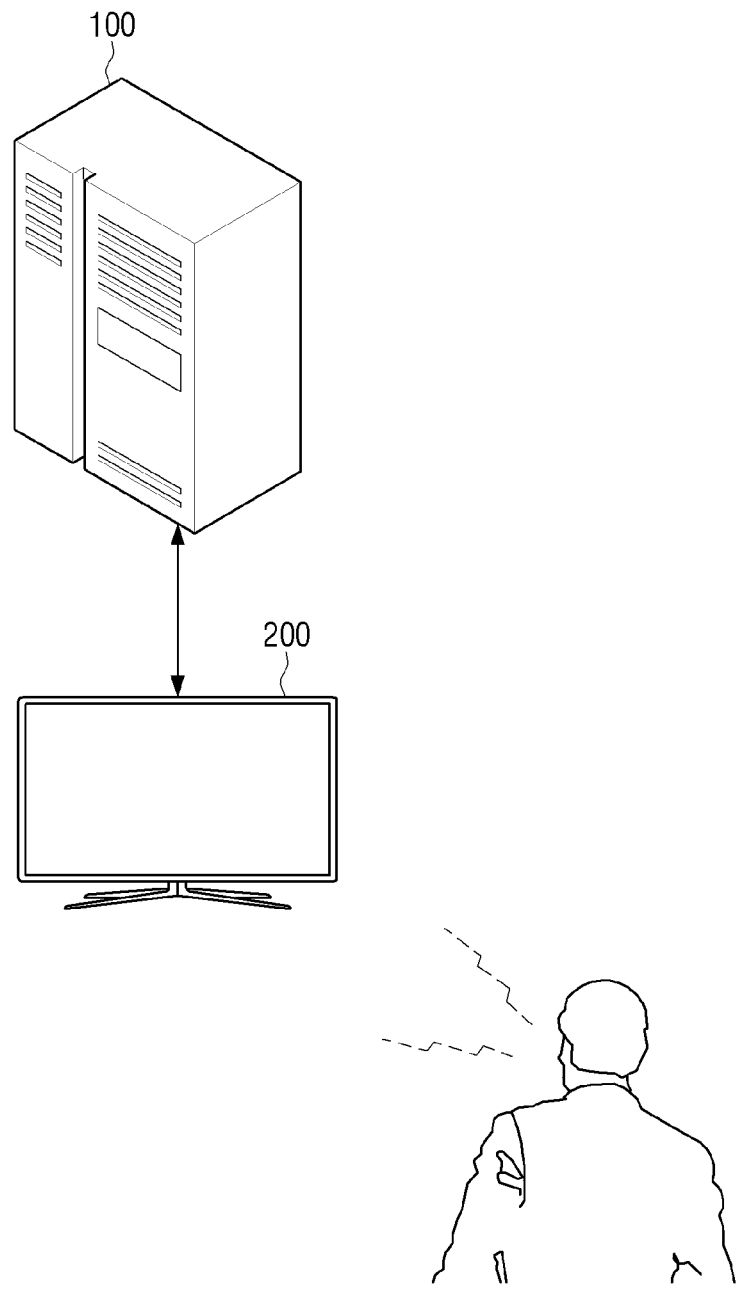
FIG. 1 is a diagram illustrating a voice recognition system according to an exemplary embodiment.

The exemplary embodiments of the present disclosure may be diversely modified.

Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the embodiments. Thus, it is apparent that the exemplary embodiments can be carried out without those specifically defined matters. Also, well-known functions or constructions are not described in detail since they would obscure the embodiments with unnecessary detail.

Hereinafter, the embodiments will be described in detail with reference to the accompanying drawings.

FIG. 1 is a diagram illustrating a voice recognition system 10 according to an exemplary embodiment. As illustrated in FIG. 1, the voice recognition system 10 includes a server 100 and a display apparatus 200.

The server 100 may communicate with the display apparatus 200. In particular, the server 100 may receive a spoken voice signal corresponding to a spoken voice of a user and characteristic information of the display apparatus 200 and transmit a response signal generated based thereon. The characteristic information of the display apparatus 200 may be divided into unique information, setting information, and other information. The unique information may include panel information, type information, and the like of the display apparatus 200 and the setting information may include volume information, channel information, and the like set by the user. Further, the other information may include use region information and use time information. For example, the unique information may be a smart phone of an A maker, the setting information may be Channel 6, and the other information may be a use time of 9 to 10 O'clock. Meanwhile, the spoken voice signal may be a voice signal acquired by converting the spoken voice of the user. For example, the spoken voice signal may be a voice signal acquired by removing noise from the spoken voice of the user or a digital voice signal converted from an analog signal.

Further, the server 100 may store manuals of a plurality of display apparatuses 200. For example, the server 100 may store different manuals according to types, makers, and functions of the display apparatuses 200. Herein, the manual may mean an instruction manual or a user guide. In detail, the manual may be a technical communication document for providing a help to users who use a specific apparatus, and the like. For example, the manual may include various pieces of information including a configuration, a function, a method of use, an error solving method, A/S center connection information, cautions, and the like of each apparatus.

When the server 100 receives the spoken voice signal corresponding to the spoken voice of the user and the characteristic information, the server 100 may generate the response signal to the spoken voice signal based on the manual corresponding to the characteristic information and transmit the generated response signal to the display apparatus 200. Herein, the response signal may be variously implemented according to contents of the spoken voice signal. As one example, when the spoken voice signal is associated with contents for querying the method of use, the operation, or the function of the display apparatus 200, the server 100 finds an answer to the query in the manual to be included in the response signal. Alternatively, when the spoken voice signal is associated with a content regarding an incorrect operation of the display apparatus 200, the server 100 finds a solving method to solve the incorrect operation to be included in the response signal. Besides, the server 100 may generate and provide a response signal having various contents according to the manual and the contents of the spoken voice signal of the user. As a result, the user may perform various and accurate controls even by a voice control method. Exemplary embodiments of generating various response signals according to an example of the spoken voice signal will be described in detail in a part to be described below.

Meanwhile, the display apparatus 200 may be implemented by a broadcast receiving apparatus (a smart TV or a set-top box), but it is just an exemplary embodiment and the display apparatus 200 may be implemented by various electronic apparatuses including a smart phone, a desktop PC, a tablet PC, a notebook PC, a navigation, and the like.

In addition, the display apparatus 200 may recognize the user's spoken voice. However, this is only an example, and the display apparatus 200 may recognize the user's spoken voice through an external apparatus. For example, a remote controller may recognize the user's spoken voice and transmit the recognized spoken voice to the display apparatus. Other than a remote controller, any electronic apparatus capable of recognizing a spoken voice and communicating with the display apparatus may recognize a spoken voice and transmit the recognized spoken voice to the display apparatus.

The display apparatus 200 may determine the type of the user's spoken voice. For example, the user's spoken voice may be determined as a control signal for controlling the operation of the display apparatus 200. Alternatively, the user's spoken voice may be determined as a signal for the function and an operational state of the display apparatus 200. Determining the type of the spoken voice will be described below in detail.

When the user's spoken voice is determined as the control signal for controlling the operation of the display apparatus 200, the display apparatus 200 may perform the operation corresponding to the control signal. For example, when the spoken voice such as "volume-up" is input, the display apparatus 200 may perform an operation of turning up the volume of the display apparatus 200.

Meanwhile, when the user's spoken voice is determined as the signal for the function and the operational state of the display apparatus 200, in the case where the display apparatus 200 transmits the spoken voice signal corresponding to the input user's spoken voice and the characteristic information of the display apparatus 200 to the server 100 and receives the response signal corresponding to the spoken voice signal of the user from the server 100, the display apparatus 200 may perform the operation corresponding to the response signal. When a guide message is included in the response signal, the display apparatus 200 may display the guide message.

Meanwhile, it is described that the voice recognition system 10 includes the display apparatus 200 as described above, the voice recognition system 10 is not limited thereto. For example, any device including a voice recognition function may be used instead of the display apparatus 200. However, a device without a display function may support a voice support function, and the like instead of the display function. Hereinafter, the voice recognition system 10 including the display apparatus 200 will be described for easy description. As described above, the voice recognition system 10 generates the response signal corresponding to the user's spoken voice based on the characteristic information of the display apparatus 200 to allow the user to more accurately control the display apparatus 200.

Hereinafter, the server 100 will be described in more detail with reference to FIGS. 2 to 8.

Figure 2:
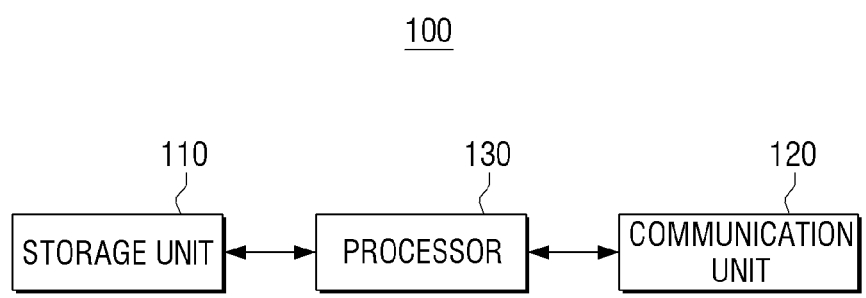
FIG. 2 is a block diagram illustrating a configuration of a server according to an exemplary embodiment.

FIG. 2 is a block diagram illustrating a configuration of a server 100 according to an exemplary embodiment. As illustrated in FIG. 2, the server 100 includes a storage unit 110, a communication unit 120, and a processor 130.

The storage unit 110 may store the manuals of the plurality of display apparatuses 200. The manuals of the display apparatuses 200 may be different from each other according to the types, the makers, and the functions of the display apparatuses 200.

In addition to the manuals, the storage unit 110 may store various programs and data. As one example, the storage unit 110 may store a program and data required to analyze the spoken voice signal. Further, the storage unit 110 may store information such as user's voice history information and EPG information.

The communication unit 120 may communicate with the display apparatus 200. When the communication unit 120 receives the spoken voice signal corresponding to the user's spoken voice and the characteristic information of the display apparatus 200 from the display apparatus 200, the communication unit 120 may transmit the response signal corresponding thereto to the display apparatus 200. To this end, the communication unit 120 may include various communication cards and modules including a wired local area network (LAN) card, a wireless LAN card, a Bluetooth module, a near field communication (NFC) module, a wireless communication module, and the like. In this case, the wireless communication module means modules that perform communications according to communication standards including IEEE, ZigBee, 3rd generation (3G), 3rd Generation Partnership Project (3GPP), long term evolution (LTE), and the like.

The processor 130 controls an overall operation of the server 100.

The processor 130 as a component that generally serves to control the apparatus may be mixedly used with a central processing unit, a micro-processor, a controller, and the like and which may control the overall operation of the apparatus may be implemented by a single chip system (system-on-a-chip or system on chip (SoC)) together with other function units such as the communication unit 120, and the like.

When the processor 130 receives the characteristic information of the display apparatus 200 from the display apparatus 200, the processor 130 retrieves the manual corresponding to the characteristic information. Herein, the characteristic information of the display apparatus 200 may be at least one of panel information, type information of the display apparatus 200, user region information, and use time information. The processor 130 may specify the display apparatus 200 and decide the corresponding manual based on unique information of the display apparatus 200, such as the panel information and the type information of the display apparatus 200 among the characteristic information.

The processor 130 may control the communication unit 120 so as to generate the response signal to the spoken voice signal based on the manual and transmit the generated response signal to the display apparatus 200. As described above, the response signal may be variously implemented according to the contents of the spoken voice signal.

Figure 3:
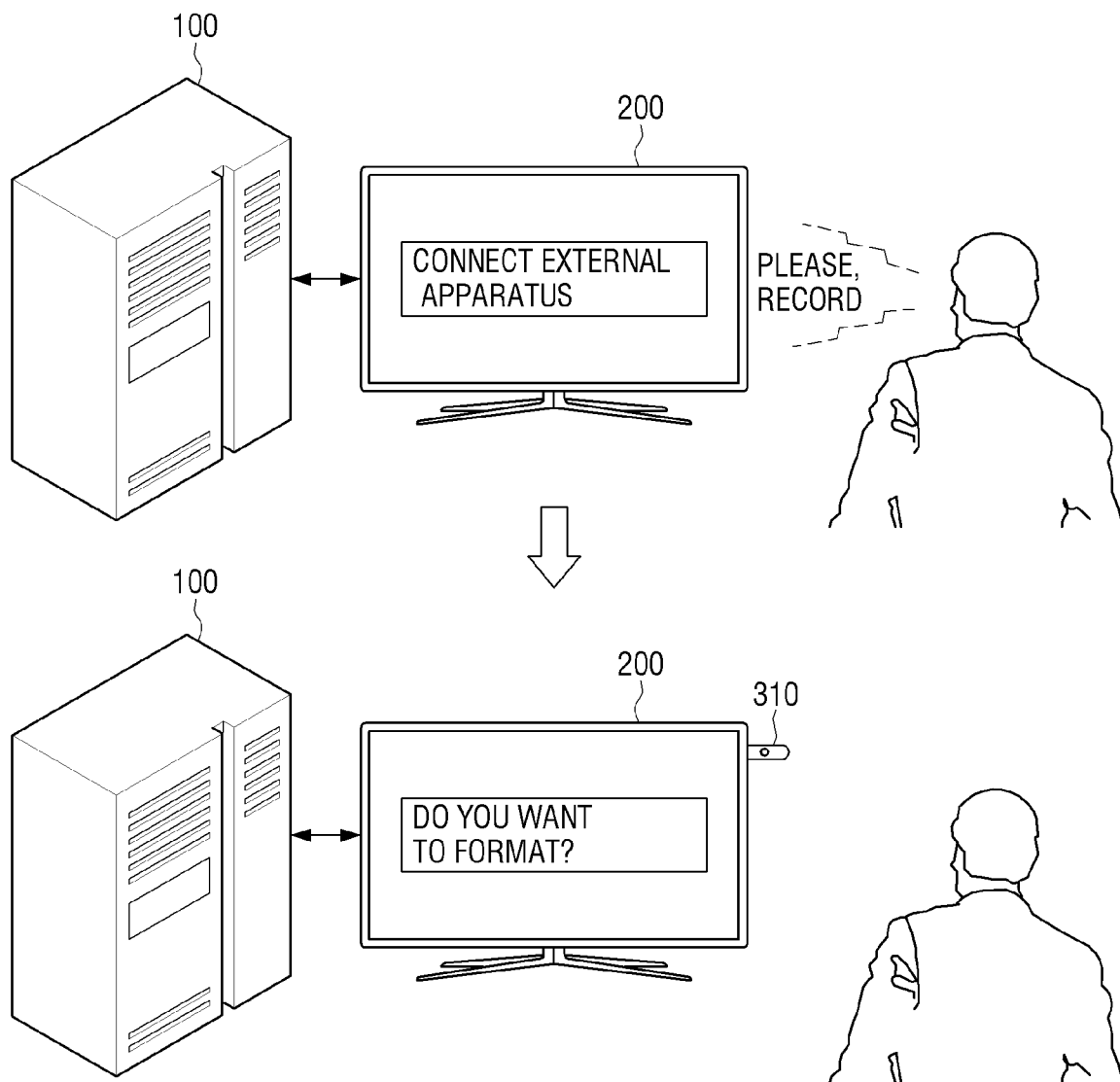
FIG. 3 is a diagram for describing one example of generating a response signal by using contents of a spoken voice of a user and a manual.

FIG. 3 is a diagram for describing one example of generating a response signal by using contents of a spoken voice of a user and a manual.

When the spoken voice is the signal for the function of the display apparatus 200, the processor 130 may generate a guide message to guide a method for executing the function according to the manual corresponding to the display apparatus 200 and transmit the response signal including the generated guide message to the display apparatus 200. As illustrated in FIG. 3, when the user speaks "Please, record", the spoken voice signal corresponding to the input spoken voice is transmitted to the server 100 together with the characteristic information of the display apparatus 200.

The processor 130 receives the spoken voice signal and the characteristic information through the communication unit 120. The processor 130 detects a manual corresponding to the received characteristic information among the manuals prestored in the storage unit 110. The processor 130 checks whether the display apparatus 200 has an external apparatus recording function based on the detected manual. For example, when the display apparatus 200 is a model having the external apparatus recording function, the processor 130 may transmit the response signal including a guide message "Please, connect an external apparatus." to the display apparatus 200. In this case, the response signal may include a control signal to display the guide message and a control signal to notify, when an external apparatus 310 is connected to the display apparatus 200, a connection state to the server 100. Accordingly, when the user connects the external apparatus 310 to the display apparatus 200 afterwards, the display apparatus 200 may transmit an external apparatus connection completion signal to the server 100.

In this case, the external apparatus may be an external apparatus memory stick or various storage media connected to the external apparatus and may be implemented through various wired interfaces such as an HDMI and various wireless interfaces such as WFi, Bluetooth, and the like in addition to the external apparatus.

When the processor 130 receives the external apparatus connection completion signal from the display apparatus 200, the processor 130 examines the manual with respect to an operation after external apparatus connection completion. In FIG. 3, it is assumed that the external apparatus is used at first and it is assumed that when the external apparatus is used at first, the manual includes contents that a format is requested to the user. As a result, the processor 130 may transmit the response signal including a guide message "Do you want to format?" to the display apparatus 200 based on the manual.

In FIG. 3, it is assumed that the display apparatus 200 is the apparatus having the external apparatus recording function, but the display apparatus 200 may be a display apparatus without the external apparatus recording function or a display apparatus having an internal apparatus recording function using an embedded storage device in addition to the external apparatus recording function according to the model.

In the case of the model having both the external apparatus recording function and the internal apparatus recording function, the processor 130 may transmit the response signal including a guide message "Please, select an external apparatus or an internal apparatus as a storage in which the program or data is to be recorded." to the display apparatus 200 when receiving the spoken voice "Please, record" from the user.

In this case, when the external apparatus is abnormally connected and the program or data is not thus stored, the guide message, and the like to normally connect the external apparatus may be output through the display or the voice.

On the contrary, in the case of the model having no external apparatus recording function and only the internal apparatus recording function, the processor 130 may transmit to the display apparatus 200 the response signal including a control signal to not perform the operation of displaying the guide message for guiding connection of the storage media and display a guide message for notifying that recording starts or a control signal to immediately perform recording.

Figure 4:
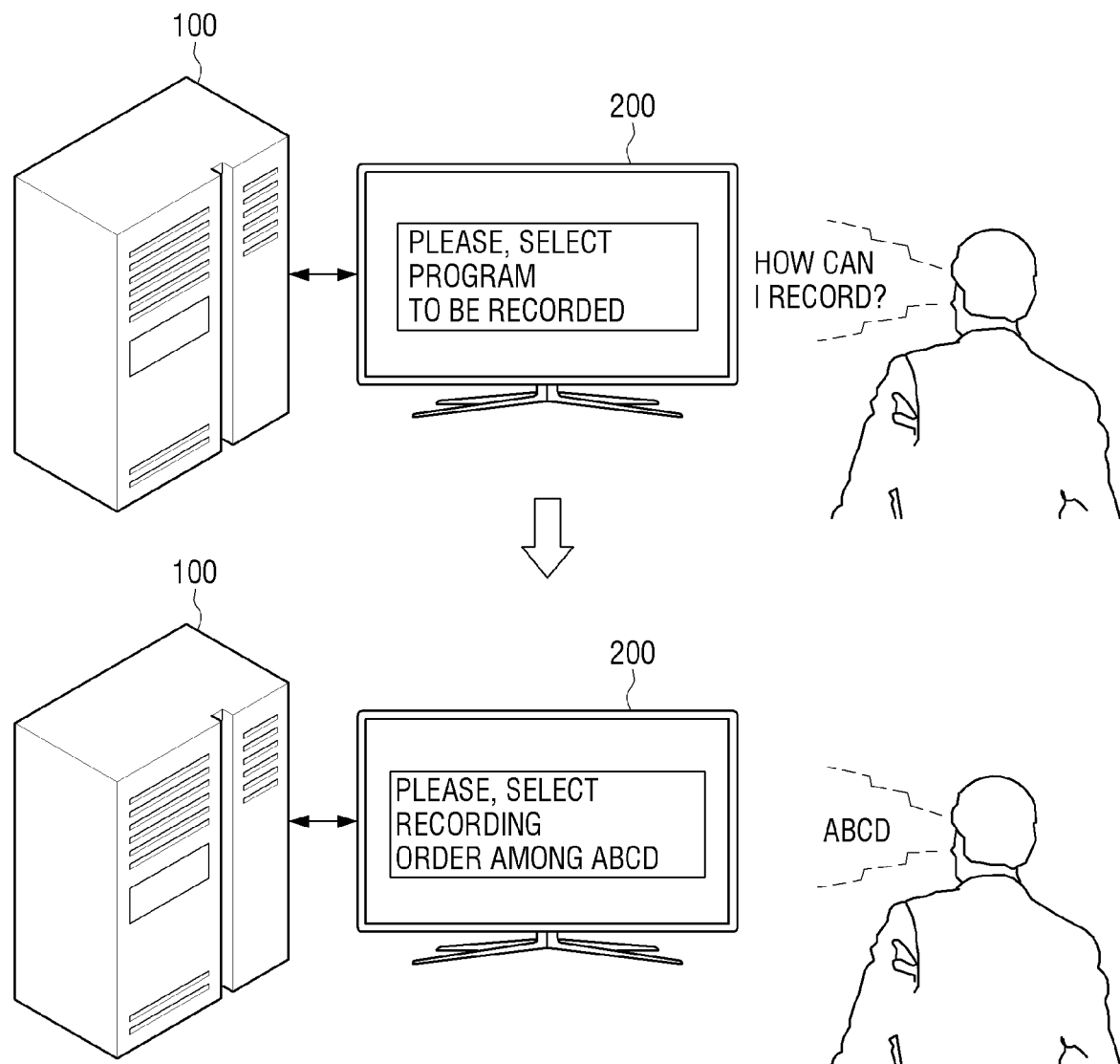
FIG. 4 is a diagram for describing an example of generating a response signal by using contents of a spoken voice of another user and a manual according to an exemplary embodiment.

FIG. 4 is a diagram for describing an example of generating a response signal by using contents of a spoken voice of another user and a manual according to an exemplary embodiment.

The user's spoken voice is an instruction for the function of the display apparatus 200 in FIG. 3, while the user's spoken voice is a query about the method of using the function of the display apparatus 200 in FIG. 4. As illustrated in FIG. 4, when the user speaks "How can I record?", the spoken voice signal corresponding to the input spoken voice is transmitted to the server 100 together with the characteristic information of the display apparatus 200.

The processor 130 detects the manual corresponding to the received characteristic information among the manuals by receiving the spoken voice signal and the characteristic information. The processor 130 examines how the display apparatus 200 performs recording based on the detected manual. In FIG. 4, it is assumed that as the user speaks "How can I perform recording?", the display apparatus 200 provides a menu to select a program to be recorded and the order of the program to be recorded and the information may be stored in the manual.

The processor 130 may transmit the response signal including a guide message "Please, select the program to be recorded." to the display apparatus 200 based on the manual. In this case, the response signal may include the control signal to display the guide message. Further, when the user speaks with respect to the program to be recorded, the response signal may include a control signal to notify the spoken voice signal for the program to be recorded to the server 100.

Accordingly, when the user speaks a program "ABCD" to be recorded afterwards, the display apparatus 200 may transmit a spoken voice signal "ABCD" to the server 100.

When the processor 130 receives the spoken voice signal for the program to be recorded from the display apparatus 200, the processor 130 examines the manual with respect to an operation after the program to be recorded is decided. The processor 130 may transmit the response signal including a guide message "Please, select the recording order among ABCD." to the display apparatus 200 based on the manual.

In FIG. 4, it is assumed that the program ABCD is recognized as a recordable program, but when there is no program ABCD or a broadcasting time is passed, the processor 130 may transmit a guide message "You cannot perform recording." to the display apparatus 200.

Further, when the program ABCD has no order and is a short program, the processor 130 may generate a response signal to allow the display apparatus 200 to immediately perform recording.

Besides, the user may query the operational state or the incorrect operation of the display apparatus 200. When the spoken voice signal is the signal for the operational state of the display apparatus 200, the processor 130 diagnoses the operational state of the display apparatus 200 and may transmit the response signal including a result of the diagnosis to the display apparatus 200. The operational state represents whether the display apparatus 200 normally operates or whether the display apparatus 200 incorrectly operates.

Figure 5:
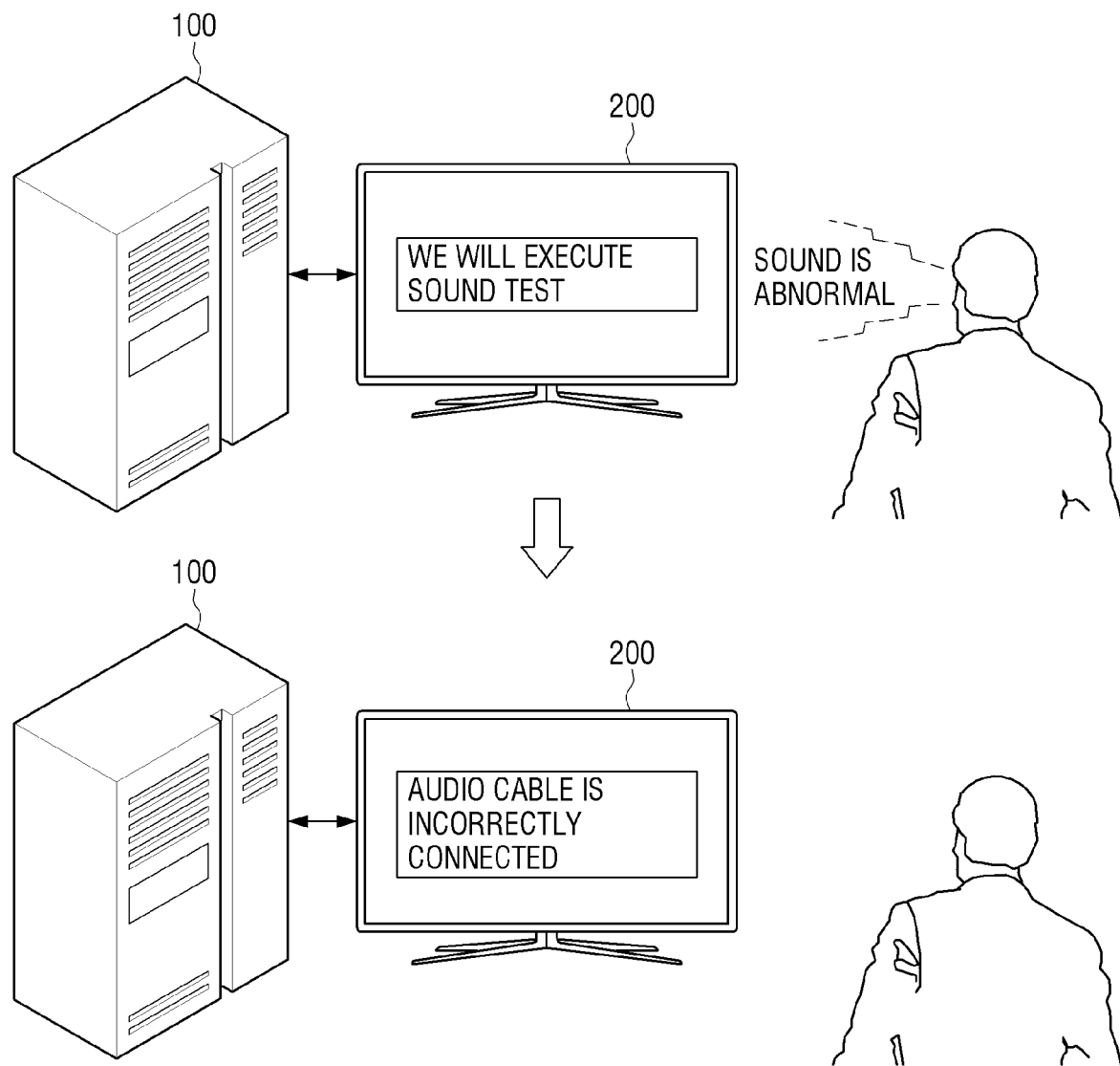
FIG. 5 is a diagram for describing operations of the server and the display apparatus according to the exemplary embodiments.

FIG. 5 is a diagram for describing operations of the server 100 and the display apparatus 200 according to the exemplary embodiments. In FIG. 5, it is assumed that the user speaks "The sound is abnormal".

When the user speaks "The sound is abnormal", the processor 130 may transmit the response signal including a guide message such as "Do you want to execute a sound test?" to the display apparatus 200.

Further, the processor 130 may include the response signal including a control command so as to allow the display apparatus 200 to execute the sound test based on the manual. As illustrated in FIG. 5, when the server 100 receives the sound test result from the display apparatus 200, the processor 130 may generate a new response signal and transmit the generated response signal to the display apparatus 200 according to the result and a guide message such as "The Audio cable is incorrectly connected." may be included in the new response signal.

Figure 6:
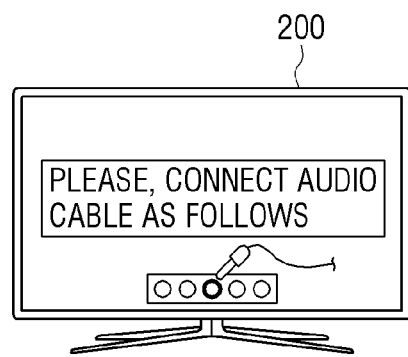
FIG. 6 is a diagram for describing a diagnosis result of the display apparatus according to an exemplary embodiment.

FIG. 6 is a diagram for describing a diagnosis result of the display apparatus 200 according to an exemplary embodiment.

When the processor 130 diagnoses that the operational state of the display apparatus 200 is an error state which can be autonomously solved, the processor 130 may transmit the new response signal including a guide message to guide a solving method for the diagnosis result to the display apparatus 200. The processor 130 may also determine whether the operational state of the display apparatus 200 can be autonomously solved based on the manual. For example, as illustrated in FIG. 6, when the audio cable is incorrectly connected as a result of executing the sound test from the spoken voice signal, the processor 130 may transmit the new response signal including a guide message such as "Please, connect the audio cable as follows." to the display apparatus 200.

Figure 7:
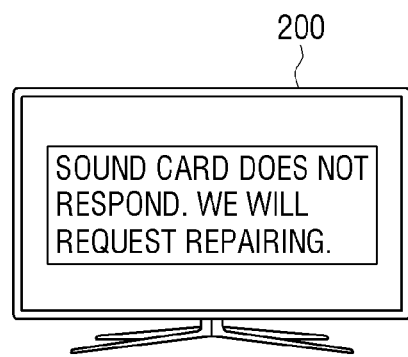
FIG. 7 is a diagram for describing a diagnosis result of the display apparatus according to another exemplary embodiment.

FIG. 7 is a diagram for describing a diagnosis result of the display apparatus 200 according to another exemplary embodiment.

When the processor 130 diagnoses that the operational state of the display apparatus 200 is an error state which cannot be autonomously solved, the processor 130 may transmit a result of the diagnosis and the characteristic information of the display apparatus 200 to a service center. The processor 130 may also determine whether the operational state of the display apparatus 200 can be autonomously solved based on the manual. For example, as illustrated in FIG. 7, although the sound test is executed from the spoken voice signal, the sound test itself may not be executed or the sound may not be normally output. In this case, the processor 130 may transmit the new response signal including a guide message such as "A sound card does not respond. We will request repairing." to the display apparatus 200. Further, the processor 130 may request repairing to the maker or service center of the corresponding display apparatus 200 based on the manual corresponding to the characteristic information of the display apparatus 200.

Figure 8:
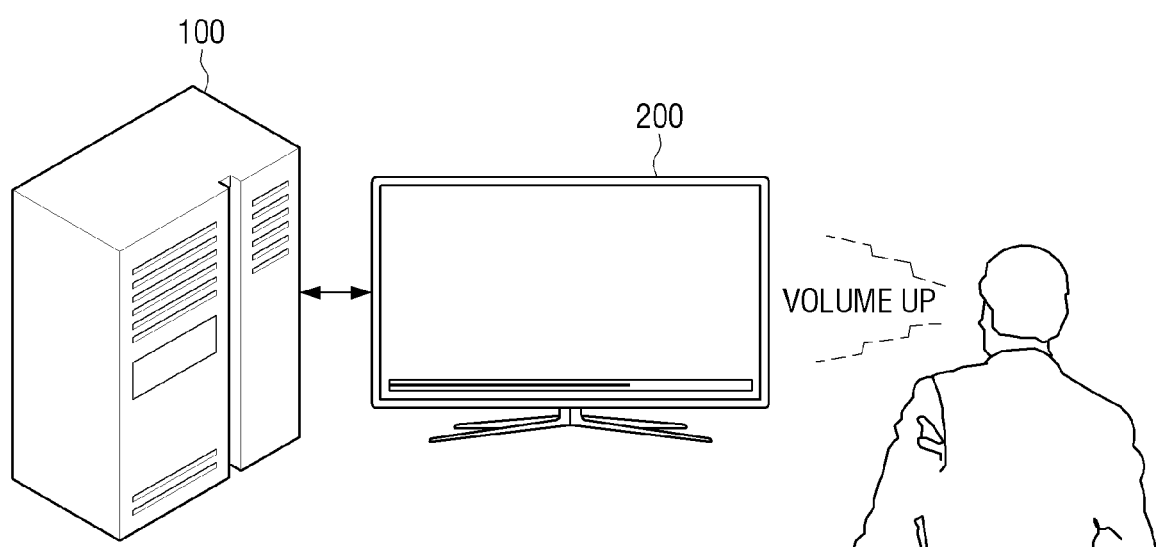
FIG. 8 is a diagram for describing a control signal for controlling the display apparatus according to an exemplary embodiment.

FIG. 8 is a diagram for describing a control signal for controlling the display apparatus 200 according to an exemplary embodiment.

Meanwhile, when the spoken voice signal is the control signal for controlling the operation of the display apparatus 200, the processor 130 may transmit the response signal including a control signal corresponding to the control signal to the display apparatus 200. For example, as illustrated in FIG. 8, when a spoken voice such as "Volume up" of the user is input, the server 100 may receive a spoken voice signal corresponding to the spoken voice from the display apparatus 200.

The processor 130 may determine that the received spoken voice signal is the signal for controlling the operation of the display apparatus 200. As a result, the processor 130 may transmit the response signal including a control signal for controlling the corresponding display apparatus 200 to the display apparatus 200 based on the manual corresponding to the characteristic information. Further, the processor 130 may make a signal to display the result be included in the response signal together with the control signal. Meanwhile, the control signal may vary depending on the display apparatus 200. As one example, a volume-up signal in the smart phone and a volume-up signal in the smart TV may be different from each other, and as a result, the processor 130 may generate the control signal corresponding to the corresponding display apparatus 200.

For example, in the case where the resolution of the smart phone of the A maker is VWGA, a spoken voice to regenerate a specific image is input from the user, the processor 130 may generate the response signal including a command to regenerate an image having VWGA among image having various resolutions and transmit the generated response signal to the display apparatus 200.

Meanwhile, in FIG. 8, it is described that even when the spoken voice signal is the control signal, the server 100 transmits a response signal thereto. However, this is to describe one of the exemplary embodiments of the server 100 and the display apparatus 200 may directly perform the operation corresponding to the control signal. This will be described below.

Figure 9:
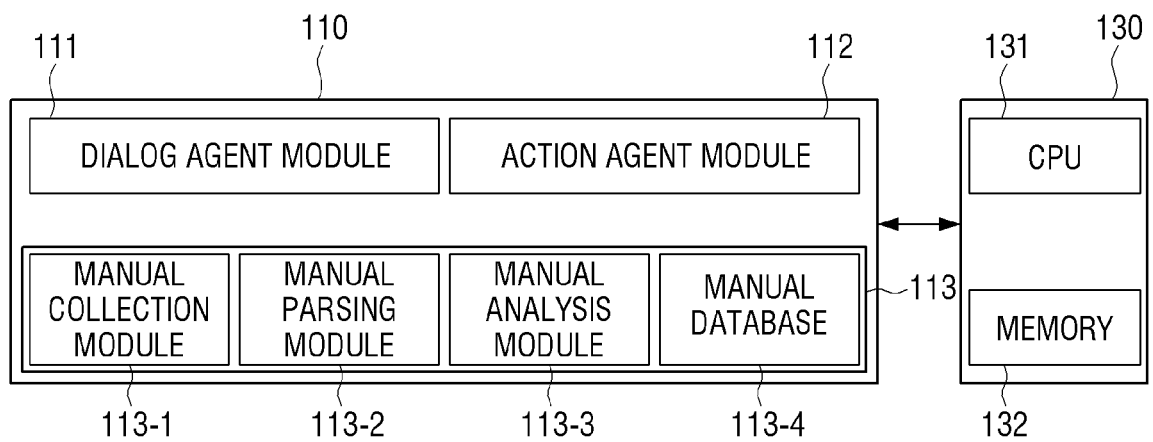
FIG. 9 is a diagram for describing, in detail, operations of a storage unit and a processor according to an exemplary embodiment.

FIG. 9 is a diagram for describing, in detail, the operations of the storage unit 110 and the processor 130 according to the exemplary embodiment.

The storage unit 110 includes a dialog agent module 111, an action agent module 112, and a manual module 113. In particular, the manual module 113 includes a manual collection module 113-1, a manual parsing module 113-2, a manual analysis module 113-3, and a manual database 113-4.

The manual collection module 113-1 is a module that collects manual related information for the display apparatus 200. The manual parsing module 113-2 is a module that dissolves a series of text strings into meaningful text strings in the collected manual related information and forms a text structure constituted thereby. The manual analysis module 113-3 is a module that changes the formed text structure to a manual having a format, which may be stored in the manual database 113-4. The manual database 113-4 stores the generated manual.

The dialog agent module 111 is a module that detects a text from the spoken voice signal corresponding to the user's spoken voice to analyze a user's input. The action agent module 112 is a module that generates the response signal from information on an object of speaking, an objective region, an objective function, and a principal feature which are extracted.

A CPU 131 accesses the storage unit 110 to perform various operations by using various modules in the storage unit 110. Further, the CPU 131 copies various modules stored in the storage unit 110 to a RAM 132 and executes the modules copied to the RAM 132 to perform various operations.

The processor 130 may extract the object of the speaking, the objective region, the objective function, and the principal feature with respect to the text detected from the spoken voice signal corresponding to the spoken voice of the user when using the dialog agent module 111. For example, when the user speaks "How can I perform recording?", the processor 130 extracts the text from the spoken voice signal corresponding to the spoken voice of the user and analyzes the extracted text to extract that the object of the speaking is a query for the function of the display apparatus 200, the objective region is the method of using the function of the display apparatus 200, and the objective function corresponds to the recording function.

The processor 130 may generate the response signal based on the manual corresponding to the characteristic information of the display apparatus 200 when using the action agent module 112. For example, when the user speaks "How can I perform recording?", since the objective function is the recording function, the processor 130 may extract information on the recording function in the manual. Further, since the objective region is the method of using the function of the display apparatus 200, the processor 130 may extract the method for using the recording function in the information on the recording function. In addition, since the object of the speaking is the query for the function of the display apparatus 200, the processor 130 may generate the response signal to display a detailed description of the method for using the recording function.

The processor 130 does not individually use the dialog agent module 111 and the action agent module 112 but may organically use the dialog agent module 111 and the action agent module 112 based on the characteristic information received from the display apparatus 200 and the manual corresponding thereto in the respective processes.

The response signal corresponding to each display apparatus 200 is generated by the server 100 as described above, and as a result, the user may more efficiently control the display apparatus 200.

Figure 10:
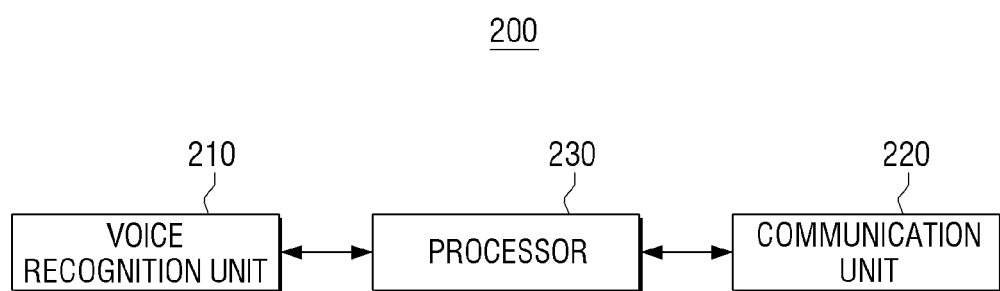
FIG. 10 is a block diagram illustrating a configuration of the display apparatus according to an exemplary embodiment.

FIG. 10 is a block diagram illustrating a configuration of the display apparatus 200 according to an exemplary embodiment. As illustrated in FIG. 10, the display apparatus 200 includes a voice recognition unit 210, a communication unit 220, and a processor 230.

Meanwhile, FIG. 10 synthetically illustrates various components by using a case in which the display apparatus 200 is an apparatus having various functions including a voice recognition function, a communication function, a display function, and the like as an example. Therefore, in some exemplary embodiments, some of the components illustrated in FIG. 10 may be omitted or modified and other components may be further added.

The voice recognition unit 210 recognizes and processes an audio signal including a user's voice to generate the user's voice signal. In this case, the voice recognition unit 210 may be provided in a body of the display apparatus 200, but this is just an exemplary embodiment and the voice recognition unit 210 may be provided outside the body (e.g., a remote controller or a separate microphone). When the voice recognition unit 210 is provided outside the body, the voice recognition unit 210 may transmit the generated user's voice signal to the body of the display apparatus 200 through the wired/wireless interface (e.g., Bluetooth, and the like).

A method in which the voice recognition unit 210 recognizes the audio signal including the user's voice to generate the user's voice signal will be described with reference to FIG. 11.

Figure 11:
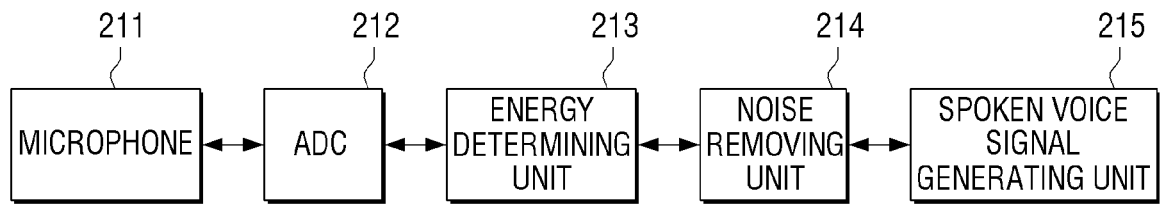
FIG. 11 is a block diagram illustrating a configuration of a voice recognition unit according to an exemplary embodiment.

FIG. 11 is a block diagram illustrating a configuration of the voice recognition unit 210 according to an exemplary embodiment. As illustrated in FIG. 11, the voice recognition unit 210 includes a microphone 211, an analog-digital converter (ADC) 212, an energy determining unit 213, a noise removing unit 214, and a spoken voice signal generating unit 215.

The microphone 211 receives an analog type audio signal including the user's voice.

In addition, the ADC 212 converts a multi-channel analog signal input from the microphone into a digital signal.

Further, the energy determining unit 213 calculates energy of the converted digital signal to determine whether the energy of the digital signal is equal to or more than a predetermined value. When the energy of the digital signal is equal to or more than the predetermined value, the energy determining unit 213 transmits the input digital signal to the noise removing unit 214 and when the energy of the digital signal is less than the predetermined value, the energy determining unit 213 does not output the input digital signal to the outside and waits for another input. Therefore, an entire audio processing process is not activated not by the spoken voice signal but by a sound so as to prevent unnecessary power consumption.

When the input digital signal is input into the noise removing unit 214, the noise removing unit 214 removes a noise component from the digital signal including the noise component and a user's spoken voice component and outputs the digital signal without the noise component to the spoken voice signal generating unit 215. In this case, the noise component as sporadic noise which may be generated in a home environment may include an air-conditioner sound, a vacuum cleaner sound, a music sound, and the like.

The spoken voice signal generating unit 215 tracks a user's speaking position which exists in a range of 360° based on the voice recognition unit 210 by using a localization/speaker tracking module to acquire direction information for the user's spoken voice signal. In addition, the spoken voice signal generating unit 215 extracts a target sound source which exists in the range of 360° based on the voice recognition unit 210 by using the digital signal without the noise and the direction information for the user's spoken voice through a target spoken sound extraction to generate the spoken voice signal.

Meanwhile, as described above, generating the voice signal by removing unnecessary surrounding noise is just an exemplary embodiment and the technical spirit of the embodiments may also be applied to an exemplary embodiment of generating spoken voice signal by determining whether a keyword exists in the user's voice.

Referring back to FIG. 10, the communication unit 220 performs communications with the server 100. In particular, the communication unit 220 may transmit the user's spoken voice signal generated from the voice recognition unit 210 and the characteristic information of the display apparatus 200 and receive the response signal from the server 100. In this case, the communication unit 120 may be implemented by Ethernet, a wireless LAN, Wi-Fi, and the like, but is not limited thereto.

The processor 230 controls an overall operation of the display apparatus 200.

The processor 230 may determine the type of the spoken voice. The user's spoken voice may be determined as the control signal for controlling the operation of the display apparatus 200 or the signals for the function and the operational state of the display apparatus 200 of the user.

When the user's spoken voice is determined as the control signal for controlling the operation of the display apparatus 200, the processor 230 may perform the operation corresponding to the control signal. For example, when the spoken voice such as "Channel up" is input, the processor 230 may perform an operation of changing a channel of the display apparatus 200.

Meanwhile, the processor 230 may perform the same function even with respect to a similar spoken voice. For example, although different spoken voices such as "Volume up" and "Increase the sound" are input, the processor 230 may similarly perform an operation of increasing the volume. However, the processor is not limited thereto and may be configured to perform only one operation with respect to one spoken voice. For example, when the spoken voice such as "Volume up" is input, the processor 230 performs the operation of turning up the volume, but besides, when the spoken voice such as "Increase the sound", "Turn up the volume", "I can't hear the sound", or the like is input, the processor 230 may also perform no operation.

In addition, although the spoken voices overlap with each other by a plurality of users, the processor 230 may perform a corresponding operation. For example, even when the spoken voice such as "Turn up the volume" by user 1 and a spoken voice such as "I'm hungry" by user 2 are simultaneously input, the processor 230 may recognize "Volume up" by distinguishing a difference in voice between users 1 and 2 and perform an operation corresponding thereto.

Meanwhile, when the user's spoken voice is determined as the signals for the function and the operational state of the display apparatus 200, the processor 230 may transmit the spoken voice signal corresponding to the input user's spoken voice and the characteristic information of the display apparatus 200 to the server 100. However, the processor 230 is not limited thereto and the processor 230 may receive the signals for the function and the operational state of the display apparatus 200 to perform operations corresponding thereto. For example, when the processor 230 receives the spoken voice for the operational state of the display apparatus 200, the processor 230 may check the operational state and perform and display the resulting diagnosis. However, hereinafter, it is described that when the user's spoken voice is determined as the signals for the function and the operational state of the display apparatus 200, the corresponding operations are provided from the server 100. Further, when the processor 230 receives the response signal from the server 100, the processor 230 may perform the operation corresponding to the response signal. In detail, when the response signal includes the guide message or the diagnosis result, the processor 230 may display the guide message or the diagnosis result. For example, the guide message may be a message for each step for using the function of the display apparatus 200 and the diagnosis result may be information indicating whether the display apparatus 200 is normal by diagnosing the display apparatus 200.

Further, when the response signal is a control signal to perform the operation required for diagnosing the display apparatus 200, the processor 230 may perform an operation according to the control signal and transmit a state of the operation to the server 100 through the communication unit 120. For example, when the processor 230 receives a control signal for diagnosing a displayed image from the server 100, the processor 230 may check the quality, the capacity, and the display state of the displayed image according to the received control signal and transmit the checked quality, capacity, and display state to the server 100.

As describe above, the display apparatus 200 transmits the characteristic information to more efficiently control the function of the display apparatus 200 through the user's spoken voice.

Figure 12:
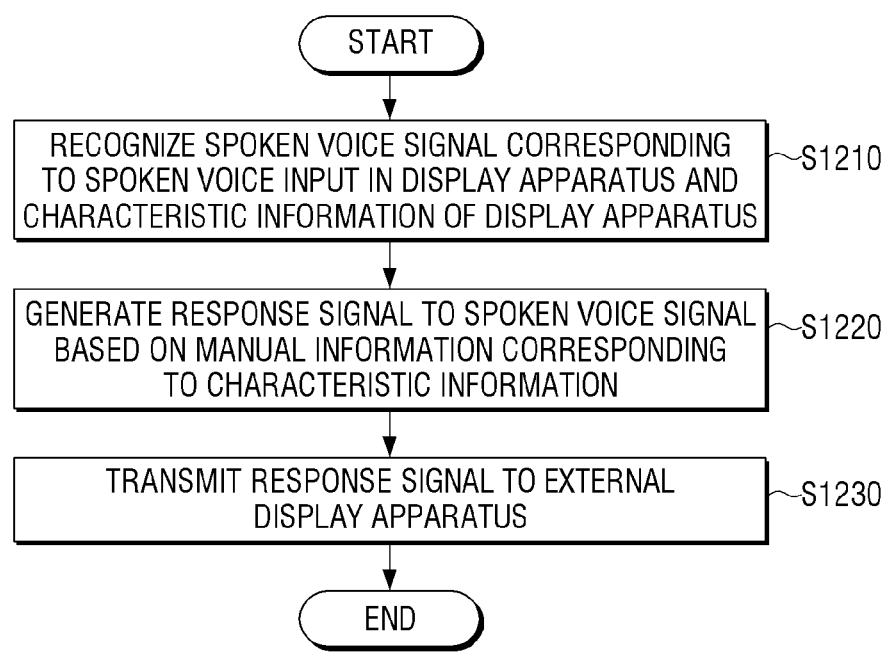
FIG. 12 is a flowchart for describing a control method of the server according to an exemplary embodiment.

FIG. 12 is a flowchart for describing a control method of the server 100 according to an exemplary embodiment.

The server 100 may receive a spoken voice signal corresponding to a spoken voice input in the display apparatus 200 and characteristic information of the display apparatus 200 (S1210). In this case, the spoken voice signal may be a digital signal converted from an analog signal.

In addition, the server 100 generates a response signal to the spoken voice signal based on a manual corresponding to the characteristic information (S1220). Further, the server 100 transmits the generated response signal to the display apparatus 200 (S1230).

Moreover, in transmitting the response signal to the display apparatus 200 (S1230), when the spoken voice signal is a signal for a function of the display apparatus 200, a guide message for guiding a method for executing the function according to the manual corresponding to the display apparatus 200 is generated to transmit the response signal including the guide message to the display apparatus 200.

In addition, in transmitting the response signal to the display apparatus 200 (S1230), when the spoken voice signal is a signal for an operational state of the display apparatus 200, the operational state of the display apparatus 200 is diagnosed to transmit the response signal including a result of the diagnosis to the display apparatus 200.

Further, in transmitting the response signal to the display apparatus 200 (S1230), when it is determined that the operational state of the display apparatus 200 is an error state which can be autonomously solved, the response signal further including the guide message for guiding a solving method for the diagnosis result may be transmitted to the display apparatus 200.

Moreover, in transmitting the response signal to the display apparatus 200 (S1230), when it is determined that the operational state of the display apparatus 200 is an error state which cannot be autonomously solved, the diagnosis result and the characteristic information of the display apparatus 200 may be transmitted to the service center.

Meanwhile, the characteristic information may include at least one of panel information, type information of the display apparatus 200, user region information, and use time information.

Figure 13:
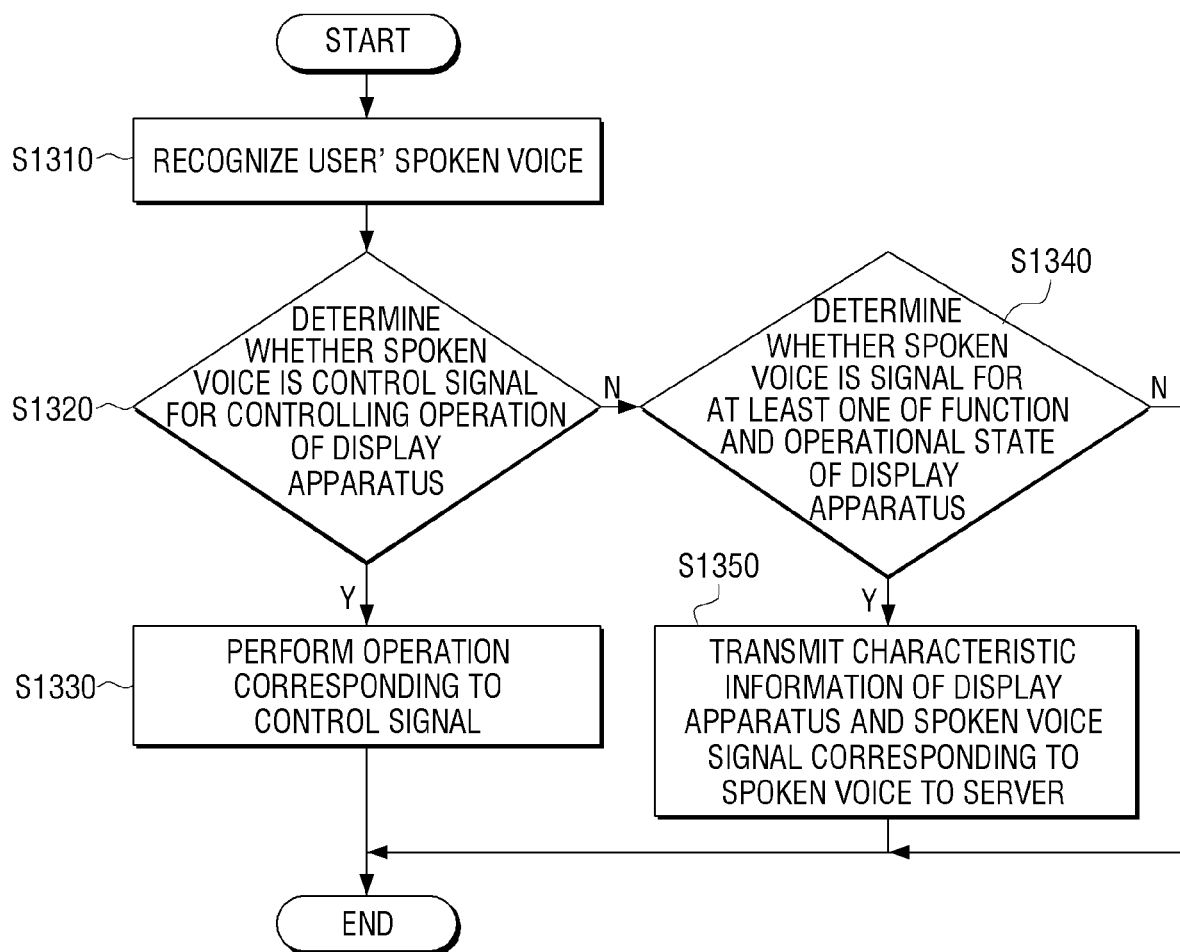
FIG. 13 is a flowchart for describing a control method of the display apparatus according to an exemplary embodiment.

FIG. 13 is a flowchart for describing a control method of the display apparatus 200 according to an exemplary embodiment.

The display apparatus 200 may recognize the user's spoken voice signal (S1310). In addition, it is determined whether the spoken voice is the control signal for controlling the operation of the display apparatus 200 (S1320). When the spoken voice is determined as the control signal for controlling the operation of the display apparatus 200, an operation corresponding to the control signal is performed (S1330).

When it is determined that the spoken voice is not the control signal for controlling the operation of the display apparatus 200, it is determined whether the spoken voice is the signal for at least one of the function and the operational state of the display apparatus 200 (S1340). Herein, determining the type of the spoken voice is described while being divided into two steps, but is not limited thereto. For example, the display apparatus 200 may simultaneously determine whether the spoken voice is the control signal and whether the spoken voice is the signal for at least one of the function and the operational state.

When the spoken voice is determined as the signal for at least one of the function and the operational state of the display apparatus 200, the characteristic information of the display apparatus 200 and the spoken voice signal corresponding to the spoken voice are transmitted to the server 100 (S1350). The characteristic information of the display apparatus 200 may include at least one of panel information, type information of the display apparatus 200, user region information, and use time information. When it is determined that the spoken voice is not the signal for at least one of the function and the operational state of the display apparatus 200, no operation may be performed.

Further, the control method may further include receiving the response signal generated according to the manual corresponding to the characteristic information and the contents of the spoken voice signal from the server 100 and processing an operation corresponding to the response signal.

In addition, in processing the operation corresponding to the response signal, when the response signal includes the guide message or the diagnosis result, the guide message or the diagnosis result may be displayed.

Further, in processing the operation corresponding to the response signal, when the response signal is a control signal to process the operation required for diagnosing the display apparatus 200, an operation according to the control signal may be processed and a state of the operation may be transmitted to the server.

In addition, the characteristic information of the display apparatus 200 may include at least one of the panel information, the type information of the display apparatus 200, the user region information, and the use time information.

Figure 14:
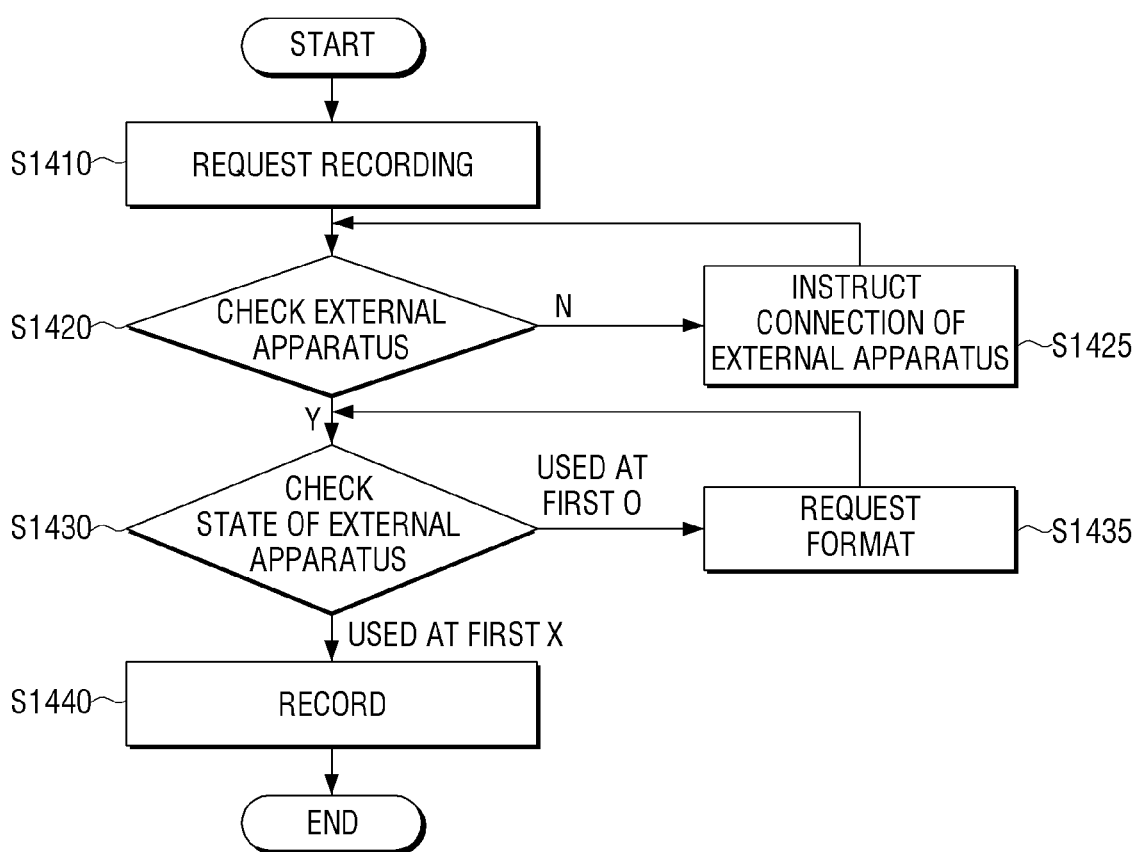
FIG. 14 is a flowchart for describing execution of a function of the display apparatus according to an exemplary embodiment.

FIG. 14 is a flowchart for describing execution of a function of the display apparatus 200 according to an exemplary embodiment.

First, there is a user's recording request (S1410). The user's recording request may be input by the spoken voice or by operating a button. Further, when the spoken voice is "Please, record now", the display apparatus 200 may immediately start recording and when the spoken voice is "How can I record?", the display apparatus 200 may transmit the characteristic information and the spoken voice signal corresponding to the spoken voice to the server 100.

When there is a recording query by the spoken voice of the user, the server 100 examines the manual corresponding to the characteristic information of the display apparatus 200. It is assumed that the external apparatus is required for recording in the corresponding manual.

The server 100 generates a response signal to check whether the external apparatus is connected to the display apparatus 200 and transmits the generated response signal to the display apparatus 200. Further, the response signal may include a control signal to check a state of the external apparatus when the external apparatus is connected and a control signal to display an instruction to connect the external apparatus when the external apparatus is not connected.

The display apparatus 200 that receives the response signal checks the external apparatus (S1420). When the external apparatus is not connected, the instruction to connect the external apparatus is given (S1425). In addition, when a predetermined time elapses, the external apparatus may be checked again.

Meanwhile, as a result of checking the external apparatus, when the external apparatus is connected, the state of the external apparatus is checked (S1430). When the external apparatus is used at first, FORMAT is requested to the user (S1435). In addition, when a predetermined time elapses, the state of the external apparatus may be checked again. Meanwhile, as a result of checking the state of the external apparatus, when the external apparatus is used at first, recording is performed (S1440).

Figure 15:
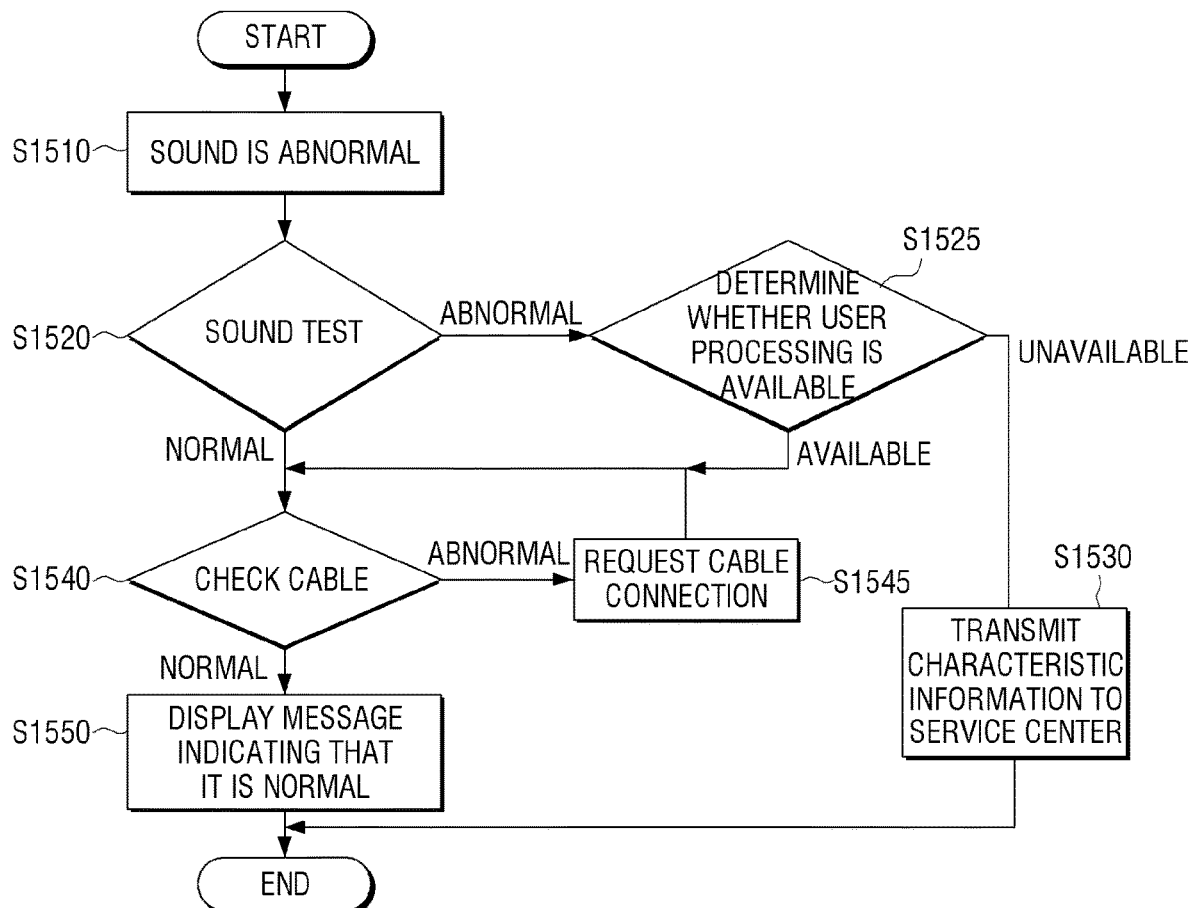
FIG. 15 is a flowchart for describing diagnosis of an operational state of the display apparatus according to an exemplary embodiment.

FIG. 15 is a flowchart for describing diagnosis of an operational state of the display apparatus 200 according to an exemplary embodiment.

First, a spoken voice of the user that the sound is abnormal is input (S1510). As a result, the display apparatus 200 transmits the characteristic information and the spoken voice signal corresponding to the spoken voice to the server 100 and the server 100 examines the manual corresponding to the characteristic information of the display apparatus 200. A response signal is generated to execute the sound test based on the corresponding manual.

The display apparatus 200 that receives the response signal from the server 100 executes the sound test (S1520). When the sound is abnormal by executing the sound test, it is determined whether the user's processing is available (S1525). Whether the user's processing is available may be determined by the display apparatus 200 itself, but a result of the sound test is transmitted to the server 100 to be determined by the server 100.

When it is determined that the user's processing is unavailable, the characteristic information is transmitted to the service center (S1530). This may also be performed by the display apparatus 200 or the server 100. Meanwhile, when it is determined that the user's processing is available, a processing method may be guided to the user.

When it is determined that the operational state is normal or that the user's processing is available even though the operational state is abnormal by executing the sound test, a cable is first checked (S1540). However, the embodiments are not limited thereto and a sound source may be preferentially checked. When the cable is abnormal, a cable connection request is made (S1545). In addition, when a predetermined time elapses, the cable may be checked again. Meanwhile, when the cable is normal, a message indicating that the cable is normal is displayed (S1550).

The control method according to various exemplary embodiments is described in FIGS. 14 and 15, but is not limited thereto. In particular, the manual may be diversified according to the maker, the type, and the like of the display apparatus 200 and not the sound test but checking the cable or checking voice data of contents may be preferentially performed with respect to the user's spoken voice "the sound is abnormal" in FIG. 15.

Figure 16:
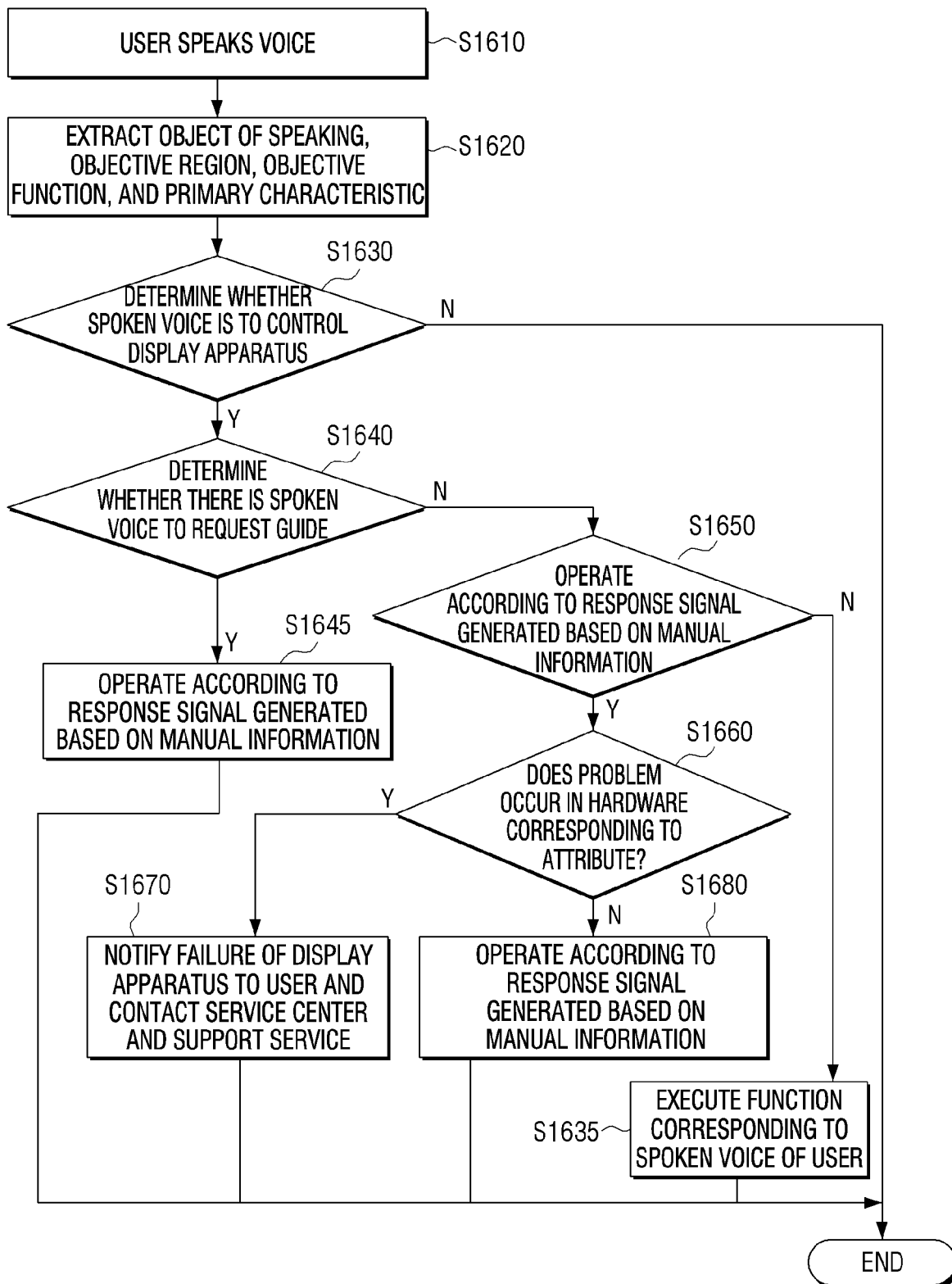
FIG. 16 is a diagram for describing, in overall, a voice recognition system according to an exemplary embodiment.

FIG. 16 is a diagram for describing, in overall, a voice recognition system 10 according to an exemplary embodiment.

First, the user's spoken voice is input (S1610). When the display apparatus 200 determines that user's spoken voice may not be directly processed, the spoken voice signal corresponding to the user's spoken voice and the characteristic information may be transmitted to the server 100. The server 100 extracts the object of the speaking, the objective region, the objective function, and the principal feature from the recognized spoken voice signal (S1620). In addition, the server 100 determines whether the spoken voice signal is used for controlling the display apparatus 200 from the extracted information (S1630). When it is determined that the spoken voice signal is not used for controlling the display apparatus 200, the server 100 may not generate a response signal or generate a response signal to allow the display apparatus 200 to perform no operation. When the user speaks "What is the dinner today?", since the spoken voice is not used for controlling the display apparatus 200, the display apparatus 200 may perform no operation.

When it is determined that the spoken voice signal is used for controlling the display apparatus 200, the server 100 determines whether the spoken voice signal is spoken voice signal for requesting guiding (S1640). When spoken voice signal is determined as the spoken voice signal for requesting the guiding, the server 100 generates the response signal based on the manual and transmits the generated response signal to the display apparatus 200. The display apparatus 200 operates according to the received response signal (S1645). When a spoken voice of the user such as "How a touch pad function of a remote controller is used?" is input, a response signal including a guide message to guide a method for using the touch pad function of the remote controller is generated based on the manual of the corresponding display apparatus 200 and the display apparatus 200 may display the guide message.

Meanwhile, when it is determined that the spoken voice signal is not the spoken voice signal for requesting the guiding, the server 100 determines whether the spoken voice signal is a spoken voice signal for requesting diagnosis (S1650). When it is determined that the spoken voice signal is the spoken voice signal for requesting the diagnosis, the server 100 determines whether there is a problem in hardware corresponding to attributes (S1660). When a spoken voice of the user such as "The image is abnormal." is input, it may be determined whether there is a problem in a video processing unit corresponding to an image attribute and when a spoken voice of the user such as "The voice is abnormal." is input, it may be determined whether there is a problem in an audio processing unit corresponding to a voice attribute.

When it is determined that there is the problem in the hardware, a failure of the display apparatus 200 is notified to the user and supporting a service is requested by contacting the service center (S1670). When it is determined that there is no problem in the hardware, the display apparatus 200 operates according to the generated response signal based on the manual (S1680). When a spoken voice of the user such as "The image is abnormal." is input and it is determined that there is no problem in the video processing unit, a message to allow the user to verify the contents or the message to request connecting the cable may be displayed.

Meanwhile, when it is determined that the spoken voice signal is not the spoken voice signal for requesting the diagnosis, the server 100 executes the function corresponding to the spoken voice signal (S1635). When the user speaks "Volume up.", the display apparatus 200 may perform an operation of turning up the volume by neither the spoken voice signal for requesting the guiding nor the spoken voice signal for requesting the diagnosis, but the spoken voice signal for controlling the display apparatus 200. In this case, the display apparatus 200 may perform the operation of turning up the volume based on the response signal generated by the server 100 after the spoken voice signal is transmitted to the server 100, but the display apparatus 200 may perform the operation of turning up the volume in itself. In the latter case, the display apparatus 200 has the voice recognition function even therein and a basic operation for voice recognition may be immediately performed without passing through the server 100.

Hereinabove, the server 100 and the display apparatus 200 have been separately described as separate apparatuses, but the server 100 and the display apparatus 200 may be configured differently therefrom.

Figure 17:
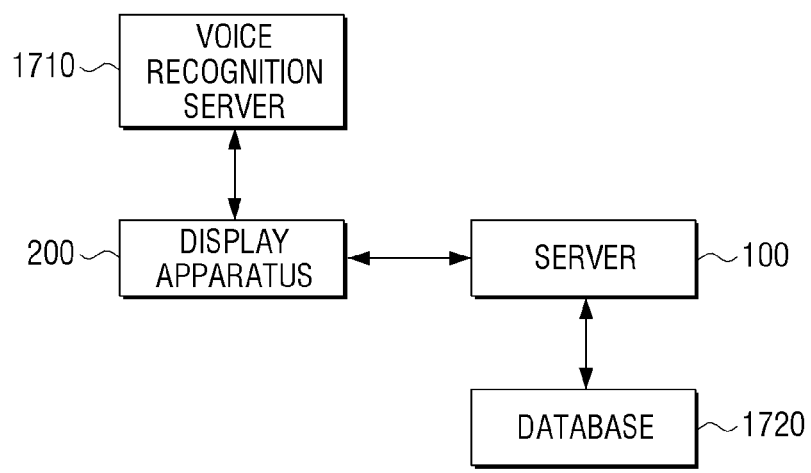
FIGS. 17 and 18 are diagrams for describing a modified example
Figure 18:
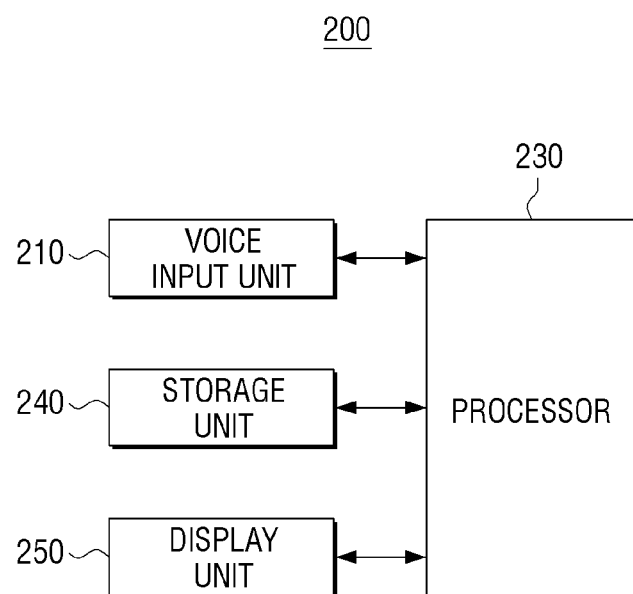

FIGS. 17 and 18 are diagrams for describing a modified example.

According to FIG. 17, the voice recognition system 10 includes the server 100, the display apparatus 200, a voice recognition server 1710, and a database 1720. A description of a configuration duplicated with the aforementioned configuration will be omitted.

The display apparatus 200 receives the spoken voice from the user and converts the received spoken voice into the spoken voice signal to transmit the converted spoken voice signal to the voice recognition server 1710. The voice recognition server 1710 may extract a text from the received spoken voice signal. The voice recognition server 1710 may transmit the extracted text to the display apparatus 200 again.

In addition, the display apparatus 200 may transmit the received text to the server 100. The server 100 analyzes the received text to generate the response signal. The server 100 may receive the manual from the database 1720 and use the received manual during generating the response signal. The database 1720 may store different manuals according to the type, the maker, and the function of the display apparatus 200.

In FIG. 17, it is described that the voice recognition server 1710 and the database 1720 are configured as separate apparatuses from the server 100.

FIG. 18 is a diagram for describing that the voice recognition system is constructed in the display apparatus 200. According to FIG. 18, the display apparatus 200 includes a voice input unit 210, a storage unit 240, a display unit 250, and a processor 230. A description of a configuration duplicated with the aforementioned configuration will be omitted.

The storage unit 240 may store the manual of the display apparatus 200. In this case, only the manual for the type and the function of the corresponding display apparatus 200 may be stored and manuals for all of other display apparatuses 200 need not be stored. As a result, the manual stored in the storage unit 240 of the display apparatus 200 may be smaller in amount of information than the manual stored in the storage unit 110 of the server 100. Further, the storage unit 240 may store data for the voice recognition.

When the user's spoken voice is input by the voice input unit 210, the processor 230 extracts the text from the user's spoken voice by using the data for the voice recognition stored in the storage unit 240. In addition, the processor 230 analyzes the extracted text to operate the display apparatus 200 based on the manual stored in the storage unit 240 of the display apparatus 200.

According to the configuration of FIG. 18, the display apparatus 200 recognizes and analyzes the user's spoken voice therein to perform the resulting operation, and as a result, the display apparatus 200 may have a simpler configuration than the voice recognition system 10 of FIG. 1. As information stored in the storage unit 240, only information corresponding to the corresponding display apparatus 200 is required and communications with the server 100 need not be performed, and as a result, the communication unit 220 may not also be provided. However, the communication unit 220 is provided to process an operation corresponding to a complicated spoken voice to receive the response signal from the server 100.

As described above, according to various exemplary embodiments, the user may control the display apparatus 200 through the spoken voice, in detail, various response signals are generated based on the characteristic information of the display apparatus 200 to improve convenience and efficiency in controlling the display apparatus 200.

Meanwhile, the methods according to the various exemplary embodiments are programmed to be stored in various storage media. As a result, in various types of electronic apparatuses that execute the storage media, the methods according to the various exemplary embodiments may be implemented.

In detail, according to an exemplary embodiment, a non-transitory compute readable medium may be provided, which stores a program that sequentially performs recognizing a user's spoken voice, determining the type of the spoken voice, and processing, when the spoken voice is determined as a control signal for controlling an operation of a display apparatus, an operation corresponding to the control signal and transmitting characteristic information of the display apparatus and a spoken voice signal corresponding to the spoken voice to a server when the spoken voice is determined as a signal for at least one of a function and an operational state of the display apparatus under the control of a computer.

The non-transitory computer readable medium means not a medium that stores data for a short moment, such as a register, a cache, a memory, or the like but a medium that semipermanently stores data and is readable by an apparatus. In detail, various applications or programs may be provided while being stored in the non-transitory computer readable medium such as a CD, a DVD, a hard disk, a Blu-ray disk, a USB, a memory card, a ROM, or the like.

According to the diverse exemplary embodiments, the display apparatus and the server generate a response signal from the spoken voice signal corresponding to the spoken voice of the user based on the manual corresponding to the characteristic information of the display apparatus to perform the operation corresponding to the response signal, thereby improving user satisfaction in controlling the display apparatus.

The foregoing exemplary embodiments and advantages are merely exemplary and are not to be construed as limiting the embodiments. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A server, comprising:
a storage, and
at least one processor configured to:
  receive a user voice input being received by a display apparatus and characteristic information of the display apparatus,
  provide a response signal to the user voice input based on a manual corresponding to the characteristic information of the display apparatus among a plurality of manuals stored in the storage, and
  transmit the response signal to the display apparatus,
wherein the at least one processor is further configured to:
  based on the user voice input corresponding to a diagnosis signal requesting diagnosis of the display apparatus, diagnose the display apparatus based on the manual and transmit a result of the diagnosis to the display apparatus, and
  based on the display apparatus being diagnosed as having an error state which can be autonomously solved, transmit a guide information to guide a user to obtain a solution for the error state, to the display apparatus,
  wherein the guide information is variable according to state information of the display apparatus at a time when the user voice input is received, and
  wherein, based on a state of the display apparatus being a state in which a function related to the user voice input is performed without an operational problem in the display apparatus, the guide information is generated based on the state information related to the state of the display apparatus.

2. The server as claimed in claim 1, wherein the at least one processor is configured to transmit, based on the user voice input being identified as a signal for a function of the display apparatus, the response signal including a guide message for guiding a method for executing the function on the display apparatus according to the manual corresponding to the display apparatus.

3. The server as claimed in claim 1, wherein the at least one processor is configured to transmit, based on the display apparatus being diagnosed as having an error state which is not autonomously solved, the diagnosis result and the characteristic information of the display apparatus to a service center.

4. The server as claimed in claim 1, wherein the characteristic information of the display apparatus includes at least one of panel information, type information of the display apparatus, user region information, and use time information.

5. A display apparatus, comprising:
a display;
a receiver configured to receive a user voice input;
a communicator configured to communicate with a server; and
a processor configured to:
  based on a first user voice input corresponding to controlling a function of the display apparatus, receive data corresponding to a controlling operation of the display apparatus from the server through the communicator and perform an operation of the display apparatus according to the received data corresponding to the first user voice input, and
  based on a second user voice input corresponding to an operational state of the display apparatus, control the display to display a guide information generated by the second user voice input and state information of the display apparatus,
  wherein the guide information is variable according to the state information of the display apparatus at a time when the second user voice input is received, and
  wherein, based on a state of the display apparatus being a state in which a function related to the second user voice input is performed without an operational problem in the display apparatus, the guide information is generated based on the state information related to the state of the display apparatus.

6. The display apparatus as claimed in claim 5, wherein the state information of the display apparatus includes at least one of volume information and channel information of the display apparatus.

7. A control method of a display apparatus, the control method comprising:
receiving a first user voice input;
based on the first user voice input corresponding to controlling a function of the display apparatus, receiving data corresponding to a controlling operation of the display apparatus from a server and performing an operation of the display apparatus according to the received data corresponding to the first user voice input,
based on a second user voice input corresponding to an operational state of the display apparatus, displaying a guide information generated by the second user voice input and state information of the display apparatus,
wherein the guide information is variable according to the state information of the display apparatus at a time when the second user voice input is received, and
wherein, based on a state of the display apparatus being a state in which a function related to the second user voice input is performed without an operational problem in the display apparatus, the guide information is generated based on the state information related to the state of the display apparatus.

8. The control method as claimed in claim 7, wherein the state information of the display apparatus includes at least one of volume information and channel information of the display apparatus.

* * * * *